United States Patent
Aoyama et al.

(10) Patent No.: US 9,471,655 B2
(45) Date of Patent: Oct. 18, 2016

(54) ENABLING SYMPTOM VERIFICATION

(75) Inventors: Nozomu Aoyama, Kanagawa (JP);
Toshimichi Arima, Kanagawa-ken (JP);
Yukihiro Murakami, Kanagawa (JP);
Tadashi Tsumura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1827 days.

(21) Appl. No.: 12/323,633

(22) Filed: Nov. 26, 2008

(65) Prior Publication Data

US 2009/0172034 A1  Jul. 2, 2009

(30) Foreign Application Priority Data

Dec. 27, 2007  (JP) .................. 2007-338120

(51) Int. Cl.
  G06F 17/30  (2006.01)
  G06N 5/04   (2006.01)

(52) U.S. Cl.
  CPC ......... G06F 17/30572 (2013.01); G06N 5/045 (2013.01)

(58) Field of Classification Search
  CPC .................................................. G06F 11/0781
  USPC ......................................................... 707/694
  See application file for complete search history.

(56) References Cited

U.S. PATENT DOCUMENTS

| | | | | |
|---|---|---|---|---|
| 6,016,546 A * | 1/2000 | Kephart | ................ | G06F 21/564 726/24 |
| 7,251,584 B1 * | 7/2007 | Perazolo et al. | .............. | 702/183 |
| 2007/0299943 A1 * | 12/2007 | Ogle et al. | .................... | 709/221 |

FOREIGN PATENT DOCUMENTS

WO   2006095506 A1   9/2006

OTHER PUBLICATIONS

Chilukuri et al. "Symptom Database Builder for Autonomic Computing", 2006, IEEE.*
Brodie et al., "Automated Support for Classifying Software Failure Reports", 2003.*
IBM; "An Architectural Blueprint for Autonomic Computing" Jun. 2005; Third Edition; 33 pages; International Business Machines Corporation, Hawthorne, NY; USA.
IBM Japan Ltd; "General Information of AC Problem Determination Tool-Introduction of Build Manage Toolkit for Problem Determination" Nov. 22, 2006; Japan.
(Continued)

*Primary Examiner* — Mariela Reyes
*Assistant Examiner* — Dawaune Conyers
(74) *Attorney, Agent, or Firm* — D'Ambrosio & Menon, PLLC; Usha Menon (57) ABSTRACT

Systems, products and methods for enabling symptom verification. Verifying a symptom may include eliminating repeated symptom definitions or eliminating symptoms having low accuracy. A computer system enables verification of a symptom including a rule for detecting a set of events related to a given problem. The computer system includes a symptom database which stores the symptom, a specimen database which stores a specimen including a set of events detected according to a rule of a certain symptom, and an analysis unit which analyzes the specimen stored in the specimen database using a new symptom in order to determine whether to add the new symptom to the symptom database. The present disclosure also includes a method and a computer program for enabling verification of a symptom including a rule for detecting a set of events related to a given problem.

14 Claims, 9 Drawing Sheets

(56) References Cited

OTHER PUBLICATIONS

IBM Japan Ltd; "Description of Autonomic Technology—Introduction of State-of-the-Art Technology Supporting AC" Nov. 22, 2006; Japan.

Miller, Brent A.; "The Autonomic Computing Edge: The Role of Knowledge in Autonomic Systems" Sep. 13, 2005; 6 pages; Autonomic Computing Architecture, International Business Machines; USA.

Clark, James, Derose, Steve; "XML Path Language (XPath)" Nov. 16, 1999; Version 1.0; 30 pages; Massachusetts Institute of Technology; USA.

IBM; "Symptoms Reference. Specification" 2006; Version 2.0; 61 pages; International Business Machines, Armonk, NY; USA.

Perazolo, Marcelo; "Symptoms Deep Dive, Part 1: The Autonomic Computing Symptoms Format—Know Thy Symptoms, Heal Thyself" Oct. 18, 2005; 8 pages; Autonomic Computing Architecture; International Business Machines; USA.

Perazolo, Marcelo; "Symptoms Deep Dive, Part 2: Cool Things You Can Do with Symptoms—Use Common Scenarios and Patterns for Increased Autonomic Computing" Dec. 13, 2005; 9 pages; Autonomic Computing Architecture; International Business Machines; USA.

Perazolo, Marcelo; "Symptoms Deep Dive, Part 3: Classify Your Symptoms-Introducing a Standard Taxonomy of Autonomic Computing Symptoms to Help Identify Situation Categories" May 2, 2006; 8 pages; Autonomic Computing Architecture; International Business Machines; USA.

Doraisamy, Kalpana; Rengasayee, Ajay G; Salahshour, Abdi; "Symptomatic Event Visualizer, Part 1: Challenges in Data Collection—How Can a Common Event Format and a Symptom Repository Help Address the Complexity of Business IT?": Jun. 19, 2007; 5 pages; Autonomic Computing Architecture; International Business Machines; USA.

Bloom. Jennifer; "LTA for Multievent Software Problem Analysis—Using the Log and Trace Analyzer to Help Diagnose Software Problems When They Span Multiple Systems" Feb. 20, 2007; 14 pages; Autonomic Computing Team; International Business Machines; USA.

JPO Notice of Allowance dated May 11, 2012 issued for Japanese counterpart patent application No. 2007-338120.

\* cited by examiner

FIG. 1

WAS SystemOut.log

[5/11/06 4:41:59:647 EDT] 00000018 TCPPort E TCPC0003E: TCP Channel TCP_5 initialization failed. The socket bind failed for host 177.12.247.100 and port 9352. The port may already be in use.

[5/11/05 4:41:59:656 EDT] 00000018 ChannelFramew E CHFW0029E: Error initializing chain DCS because of exception com.ibm.wsspi.channel.framework.exception.RetryableChannelException: Address already in use

[5/11/06 4:44:04:677 ETD] 00000018 TCPChannel A TCPC0001I: TCP Channel TCP_5 is listening on host lenny.aetnat.com (IPv4:177.12.247.100) port 9352.

⇒

COMMON BASE EVENT (CBE)

```
<CommonBaseEvent creationTime="0005-11-06T 17.41.59.647+09:00" globalInstanceId="A1DC521ED57E4136"
  msg="TCPC0003E: TCPChannel TCP_5 initialization failed. The socket bind failed for host 177.12.247.100
  and port 9352. The port may already be in use. "severity="50" version="1.0.1">
<sourceComponentId component="IBM WebSphere Application Server - Express" componentIdType="ProductName"
  location="9.68.206.21" locationType="IPV4" subComponent="TCPort" threadId="00000018"
  componentType="WebSphereExpressServer"/>
```

FIG. 2A

```
<msgDataElement> <msgId> TCPC0003E <imsgId> <msgIdType> IBM4.4.1</msgIdType> </msgDataElement>
<situation categoryName="ReportSituation">
<situationType xmlns:xsi="http://www.w3.org/2001/XMLSchema-instance" xsi:type="ReportSituation"
reasoningScope="INTERNAL" reportCategory="STATUS"/>
</situation>
</CommonBaseEvent>
<CommonBaseEvent> ..... <msgId> CHFW0029E </msgId> ..... </CommonBaseEvent>
<CommonBaseEvent> ..... <msgId> TCPC0001I </msgId> ..... </CommonBaseEvent>
```

ENABLING SYMPTOM VERIFICATION

PRIORITY

This application is based on and claims the benefit of priority from Japanese patent application No. 2007-338120, filed Dec. 27, 2007.

BACKGROUND

An autonomic computing environment is able to manage itself and dynamically adapt to change in accordance with business policies and objectives. An autonomic system is capable of monitoring an environment (Monitoring), analyzing a monitoring result (Analyzing), planning an improvement if there is any problem (Planning), and executing the improvement (Executing). Collectively, these processes are known as the MAPE loop. Since the autonomic computing environment enables an activity to be performed on the basis of self-monitoring or self-detecting in an IT environment, an IT professional does not need to start a task. The autonomic computing environment may be self-configuring (dynamically adapting to changing environments), self-healing (discovering, diagnosing, and correcting problems to prevent system disruptions), self-optimizing (tuning resources and balance workloads to maximize the use of IT resources), and self-protecting (anticipating, detecting, or identifying to prevent danger and protect against attacks).

SUMMARY

Symptom problem determination systems accumulate a large number of symptoms. Symptoms include a rule for detecting a set of events related to a given problem. It is problematic to register and add symptoms endlessly due to recording medium capacity, security, and compliance. Repeated symptom definitions may cause a plurality of symptoms to be extracted even if only one type of problem occurs. Non-associated symptoms may be extracted due to low accuracy of a symptom rule (a 'loose symptom rule'). Specifically, a detection error may occur. A user is not able to identify the repeated symptom definition or the detection error.

Methods, systems, and products are disclosed for enabling verification of a symptom. One embodiment of the present invention is a computer system for enabling verification of a symptom. The computer system may be a server computer for implementing autonomic computing or be a computer associated with a server computer. The computer system includes a symptom database which stores the symptom, a specimen database which stores a specimen including a set of events detected according to a rule of a certain symptom, and an analysis unit which analyzes the specimen stored in the specimen database using a new symptom in order to determine whether to add the new symptom to the symptom database. A result of the analysis may be presented on a display device connected to the computer system. Additional embodiments may include a method of causing a computer system to perform the method described below and a computer program that causes the foregoing computer system to perform the method described below. The computer program may be distributed in the form of a magnetic disk, an optical disk, a semiconductor memory, or other recording mediums or provided via a network.

One embodiment of the present invention is a computer system for enabling verification of a new symptom. The new symptom includes a rule for detecting a set of events related to a given problem. The computer system includes a symptom database which stores existing symptoms and a specimen database which stores existing specimens. An existing specimen includes a set of events detected according to a rule of one of the existing symptoms. The computer system also includes an analysis unit comprising a computer processor and a computer memory operatively coupled to the computer processor. The computer memory has disposed within it computer program instructions capable of analyzing the existing specimens stored in the specimen database using the new symptom to determine whether to add the new symptom to the symptom database.

One embodiment of the present invention is a computer-implemented method for enabling verification of a new symptom. The method includes providing a symptom database which stores existing symptoms; providing a specimen database which stores existing specimens; and analyzing the specimens stored in the specimen database using a new symptom in order to determine whether to add the new symptom to the symptom database.

One embodiment of the present invention is a computer program product for enabling verification of a new symptom. The new symptom includes a rule for detecting a set of events related to a given problem. The computer program product is disposed upon a computer-readable medium. The computer program product includes computer program instructions capable of maintaining a symptom database which stores symptoms; computer program instructions capable of maintaining a specimen database which stores specimens; and computer program instructions capable of analyzing existing specimens stored in a specimen database using the new symptom in order to determine whether to add the new symptom to a symptom database containing existing symptoms.

An existing specimen includes a set of events detected according to a rule of one of the existing symptoms. An existing specimen may include a first specimen, which includes a set of events detected according to a rule of a certain symptom, and a second specimen which includes the first specimen and at least one of events preceding the first specimen and events following the first specimen.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Basic terms of the present disclosure will be described below.

An "event" is a change in state of a monitored resource such as a system resource, a network resource, or a network application. The event may be caused by a problem, a problem solution, or normal completion of a task. Specifically, the event includes a hardware or software failure, shutdown, a performance bottleneck, a network configuration mismatch, unintended consequences caused by an insufficient design, and a damage caused by the malice of others such as a computer virus. One example of an event is that the memory usage exceeds a threshold value.

"Common Base Event" ('CBE')is the specification of a standard form and contents for representing an event structure, which is sent as a result of a certain state and thereafter used in an enterprise management application or a business application. In the CBE, it is possible to represent data in Extensible Markup Language ('XML'). CBE is a common log format adopted as the standard by Organization for the Advancement of Structured Information Standards ('OASIS'). The Common Base Event includes logging, tracing, management, and business events.

"Knowledge" in the autonomic computing system can include almost any type of structured data or structured information that is used to perform a process, particularly a process that is allowed to be automated. Since the autonomic computing system allows wide scope for knowledge, knowledge may include data stored in a log file, status data on a management end point (touch point) or a process, and schedule data on a period during which a change to the system is allowed. Types of knowledge include, for example, a solution topology knowledge (for example, an installable unit descriptor), a policy knowledge, and a problem determination knowledge (for example, data or symptom to be monitored). A Prolog program, which is a general type of knowledge, is a set of facts and rules about a given subject. In the autonomic computing system, knowledge may be represented in some standard form so as to allow an autonomic manager to use the knowledge.

A "symptom" is one of the types of knowledge. A symptom is data indicating a potential problem or a diagnostic status related to one or more managed resources. The symptom may include three constituent elements: a symptom definition, a symptom rule, and a symptom effect. The symptom definition defines general information (metadata) on a symptom. It is possible to describe the symptom definition by using an XPATH expression, a regular expression, a decision tree, a dependency graph, a Prolog description, an ACT pattern, a TEC rule, or a neural network. The symptom rule is for use in detecting a set of events related to a given problem. It is possible to describe the symptom rule by using an XPATH expression or the like or by using a program. For the symptom effect, action to be taken at an occurrence of a problem and a detailed description of the action, if necessary, are described. Using a symptom, it is possible to detect a set of trigger events and a pattern of the set of events. Examples of the pattern include a "one-to-one" event matching, a plurality of events ('multi-event'), the occurrence number of events, the order of events (an 'event sequence'), an event time frame, a detection of nonoccurrence of events, and combinations thereof. The symptom is identified inside monitoring of the MAPE loop and used in analyzing thereof. The autonomic manager performs an association between an event and a symptom in the monitoring by using a symptom catalog. The symptom is generated by using a monitoring function such as, for example, the autonomic manager that correlates the monitored data such as, for example, the Common Base Events. The symptom may be expressed in XML.

The relationship between an event and a symptom is as described below. The event is a change in state of a monitored resource (for example, the memory usage has reached 512M). The symptom is data indicating a potential problem or a diagnostic status. Therefore, a potential problem or diagnostic status for a case where an event x (or an event x and an event y, etc.) occurs under certain conditions is, for example, that the memory is insufficient or that the memory usage exceeded the set limit three times within 10 minutes. Then, action to be taken at the occurrence of the problem or diagnostic status is, for example, to increase a buffer size.

"Autonomic" means self-management for a problem, security threat, and a system failure.

"Autonomic computing" means computing with the ability to self-manage and dynamically adapt to change in accordance with business policies or objectives.

An "autonomic computing system" is a computing system that senses its operating environment, models the behavior of the environment, and takes action to change the environment or its behavior. An autonomic computing system has the properties of self-configuration, self-healing, self-optimization, and self-protection.

An "autonomic manager" is a component that manages other software or hardware by using a control loop in autonomic computing. The control loop of the autonomic manager includes monitoring, analyzing, planning, and executing functions.

While the present disclosure is particularly used in the autonomic computing field, it is not limited to the autonomic computing field. Moreover, the present disclosure may be used also in an environment where the computer manages itself such as, for example, N1 Grid of Sun Microsystems, Inc., Adaptive Infrastructure of Hewlett-Packard Co., VALUMO of NEC Corporation, Harmonious Computing of Hitachi, Ltd., and TRIOLE of Fujitsu Limited.

According to the present disclosure, it is possible to verify a symptom such as, for example, to verify a repeated symptom definition, or to increase the accuracy of a symptom rule. This increases the effectiveness of the symptom problem determination system and enables a return of an accurate diagnostic result for an event to a user.

Various embodiments of the present invention will be described hereinafter with reference to the drawings. It will be appreciated that these embodiments are only for illustration and are not intended to limit the scope of the invention to specific implementations set forth. Moreover, unless otherwise specified, the like reference numerals designate like elements throughout the drawings referenced below.

Figure 1:
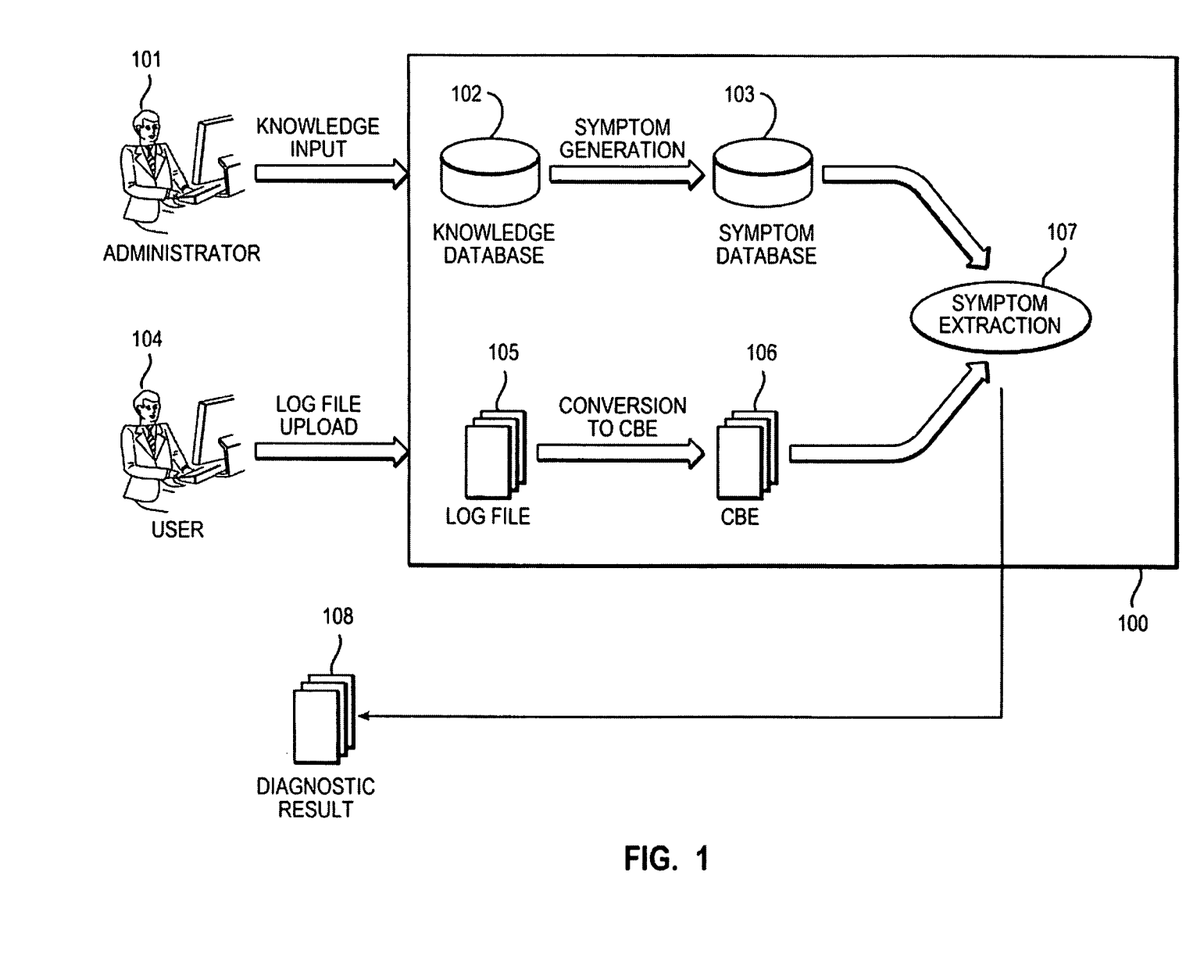
FIG. 1 is a schematic diagram of a problem determination system.

FIG. 1 shows a schematic diagram of a problem determination system in autonomic computing. An administrator (101) of the problem determination system extracts, as knowledge, the features of a log file or dump file including an error message at the occurrence of a problem from the examples of past failures and registers the features into a knowledge database (102). It is possible to construct the knowledge database using products such as DB2 from International Business Machines Corporation of Armonk, N.Y. (hereinafter 'IBM'), for example. The problem determination system (100) generates a symptom from the knowledge and stores the symptom into a symptom database (103). The symptom database is also referred to as a symptom catalog. Additionally, a user or a help desk (104) sends the log file or the dump file (105) from a computer operated by the user to a problem determination system (100). The computer operated by the user may be, for example, a client system. The problem determination system may be, for example, a server computer. The log file (or the dump file) (105) includes events of an application, a database, an application server, a server storage device, and a network, for example. The format of the log file (105) depends upon a component. Therefore, in order to unify the format of the log file or the dump file (105), the server computer (100) converts the log file (105) into a Common Base Event (106) (hereinafter, referred to as 'CBE'). Products such as DB2 and WebSphere from IBM provide functionality for directly outputting the CBE. Products such as Generic Log Adapter (GLA), an Eclipse-based development tool from IBM provide functionality for converting an existing log to the CBE.

The problem determination system (100) stores error messages and solutions corresponding to each error message in the symptom database, making it possible to provide advice to the administrator based on a past solution in the case of an reoccurring message. The problem determination system (100) analyzes the foregoing CBE (106) according to the symptom rule stored in the symptom database (103). The system extracts the symptom (107), meaning it analyzes the CBE (106) and identifies a set of events in the CBE (106) that correspond to a symptom in the symptom database (103). Further, the problem determination system (100) determines the problem or the solution to the problem based on the effect of the extracted symptom. The system presents the determination result as a diagnostic result (108) on a display device connected to the user's client system. The diagnostic result includes a clue for solving the problem using the symptom database. The diagnostic result may be presented by using a log analysis tool such as, for example, the Log Trace Analyzer (LTA) from IBM.

Figure 2A:
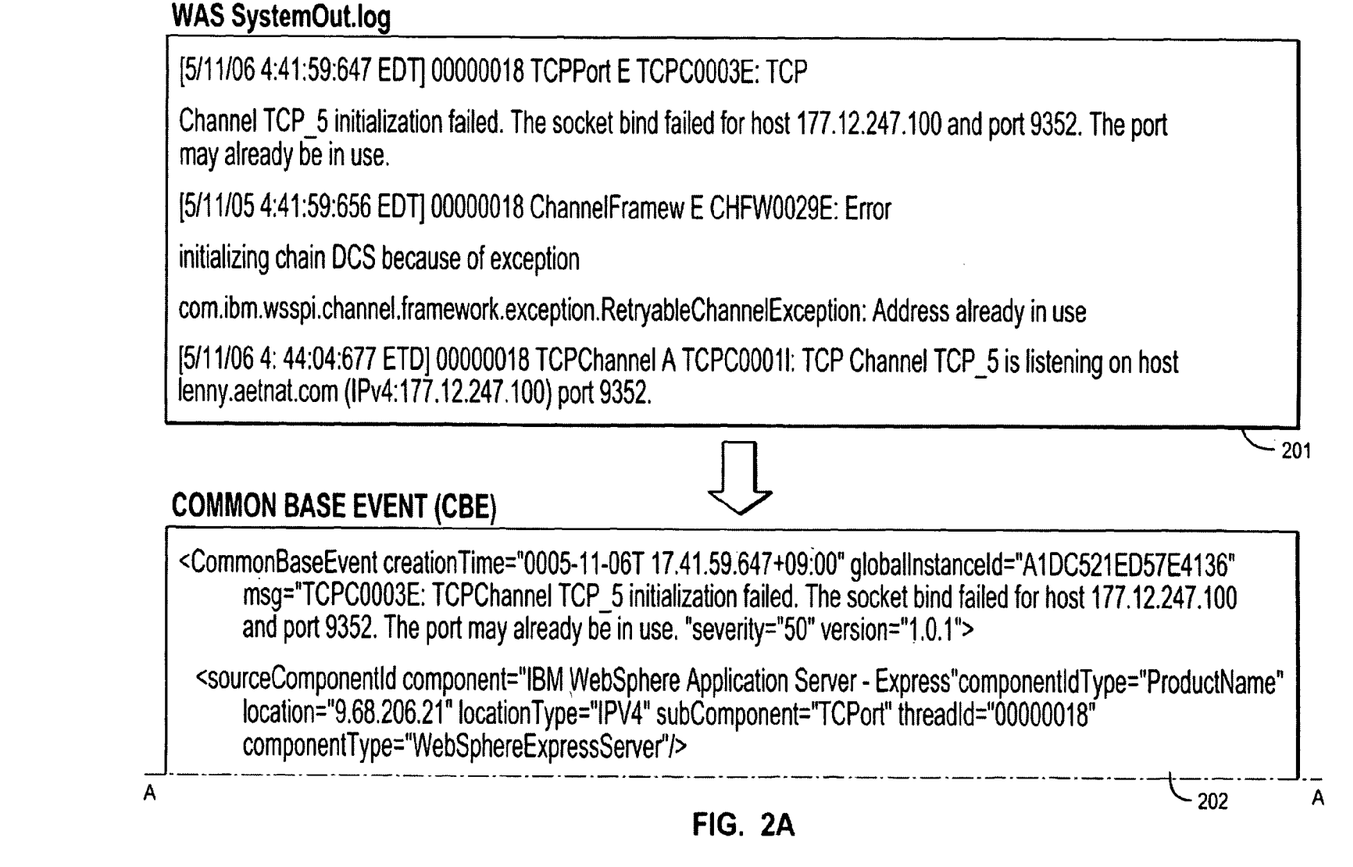
FIG. 2 is a diagram illustrating a conversion from a log file to a CBE.
Figure 2B:
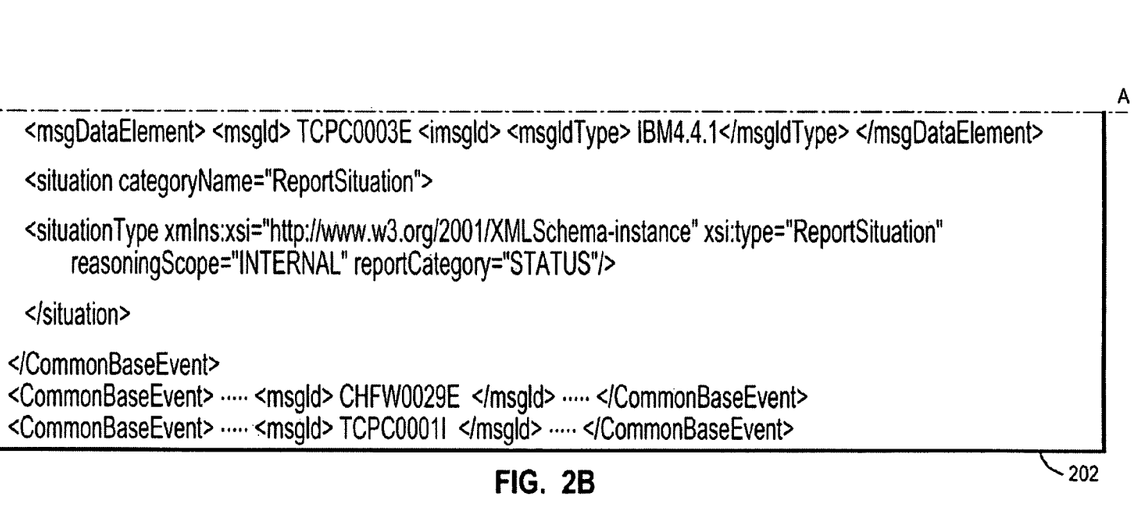

FIG. 2 shows an example of converting a log file (201) to a CBE (202). Converting from the log file (201) to the CBE (202) may be carried out by using a direct output function or a conversion tool included in software such as the DB2 and WebSphere products discussed above. The log file (201) in FIG. 2 includes events identified by message IDs, TCPC0003E, CHFW0029E, and TCPC001I and their contents. By converting the log file (201) to the CBE (202), the system converts the log file (201) to a given format for each message ID.

Figure 3:
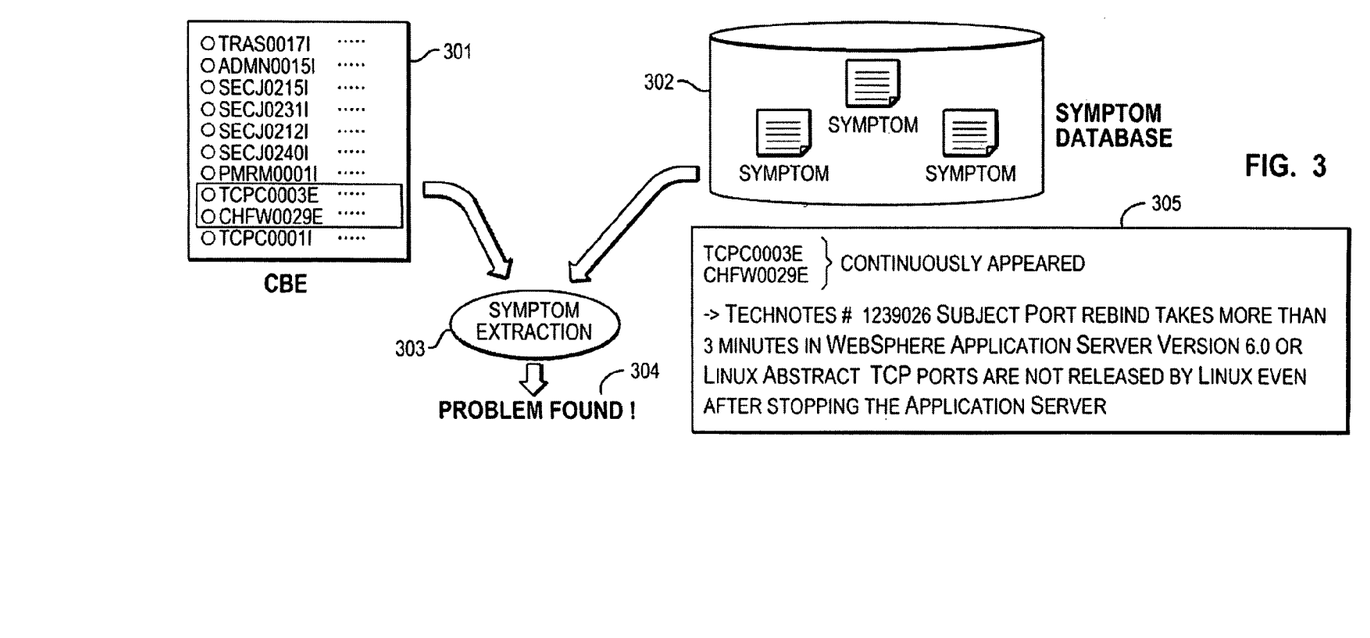
FIG. 3 is a diagram illustrating an example of analyzing the CBE using symptoms.

FIG. 3 shows an example of analyzing (303) a CBE (301) using symptoms stored in a symptom database (302). The CBE (301) includes a plurality of events identified by message IDs. A symptom database (302) has a plurality of symptoms. Analyzing the CBE (301) using the symptoms allows symptoms to be extracted by which a set of events included in the CBE are detectable. In the case of an IBM correlation rule, which is an example of the symptom rule, seven types of rules are supported. Specifically, the IBM correlation rule includes a filter rule as a stateless rule, and a collection rule, a calculation rule, an overlap rule, a sequence rule, a threshold rule, and a timer rule as stateful rules.

In FIG. 3, the CBE (301) includes a set of events identified in the order of TCPC0003E and CHFW0029E. The CBE analysis using the plurality of symptoms included in the symptom database causes an extraction of a symptom for detecting the foregoing set of events included in the CBE analysis. The symptom extraction (303) results in a problem found (304). Thereafter, a technical note (supplementing the message IDs or advice information) is presented (305) which corresponds to the symptom effect of the extracted symptom.

Figure 4:
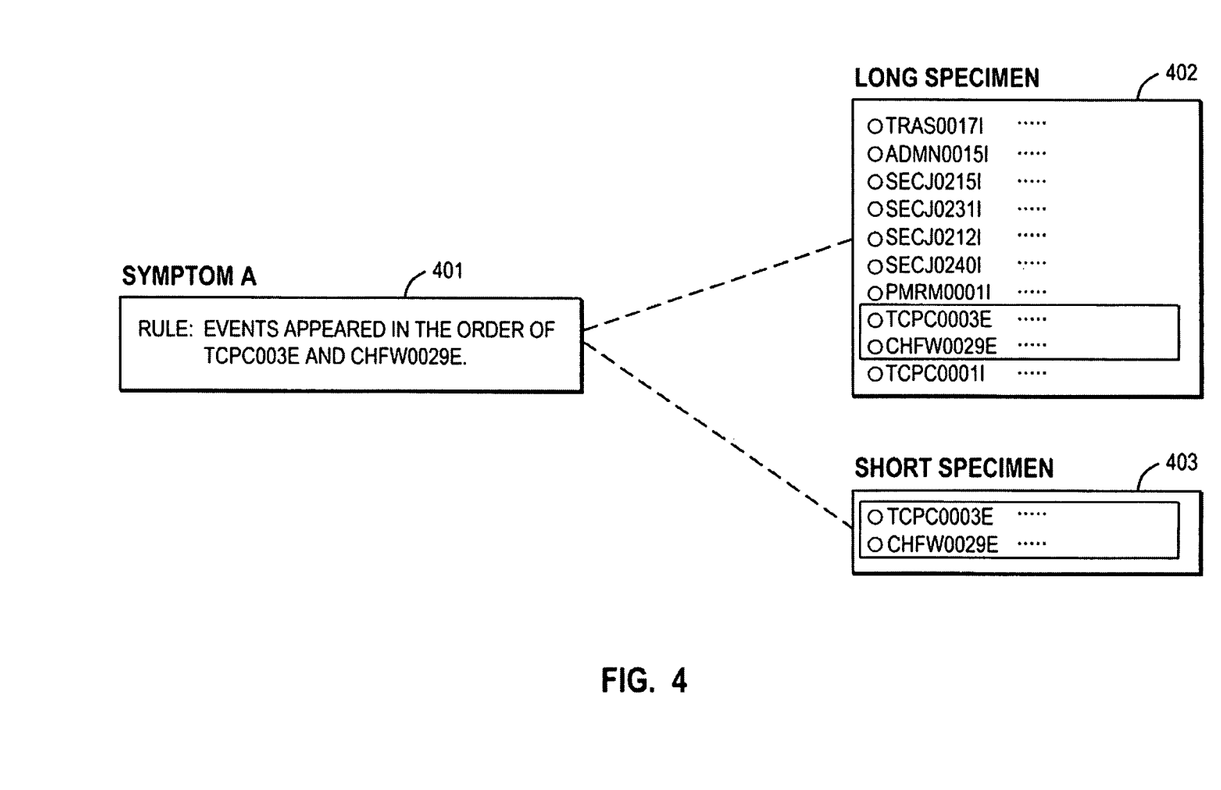
FIG. 4 is a diagram illustrating a symptom and specimens.

FIG. 4 shows a symptom and specimens used in this embodiment of the present invention. Symptom A in FIG. 4 includes a rule for detecting a set of events identified in the order of TCPC0003E and CHFW0029E. The following is an example of a rule description in XPath format.
<expression:xpathExpression>/CommonBaseEvent[contains*[msg,'TCPC0003E' and 'CHFW0029E'] or msgData Element/msgId='TCPC0003E' and 'CHFW0029E']</expression:xpathExpression>

The specimen includes a set of events detected according to the rule of a certain symptom and message identifiers for use in identifying events. Moreover, the events in the list which have been detected according to the rule of the corresponding symptom are recorded with respect to each specimen (not shown). In this embodiment of the present invention, two types of specimens are used for analysis with a certain symptom (symptom A (401)).

The first specimen, also referred to as a short specimen, includes a set of events detected according to the rule of the certain symptom. In some implementations, the first specimen may consist of only a set of events detected according to the rule of the certain symptom. The first specimen of FIG. 4 is a "match in the set of events", which means that the specimen consists of only a set of events detected according to the rule of the certain symptom, and the order of the detected events is the same as in the rule. The first specimen may be used for finding repeated or duplicate symptom definitions.

The second specimen, or long specimen, includes a set of events detected according to the rule of a certain symptom and a set of events preceding, following, or both preceding and following the set of events. In other words, the second specimen includes a set of events not detected according to the foregoing rule of the certain symptom. The first specimen is a subset of the second specimen. The second specimen may be used for verifying the accuracy of a symptom. Particularly, the second specimen is used for finding a symptom having a loose rule, (i.e., a low-accuracy symptom). A distinction between the short specimen and the long specimen is made, for example, by setting a flag in each specimen.

Figure 5:
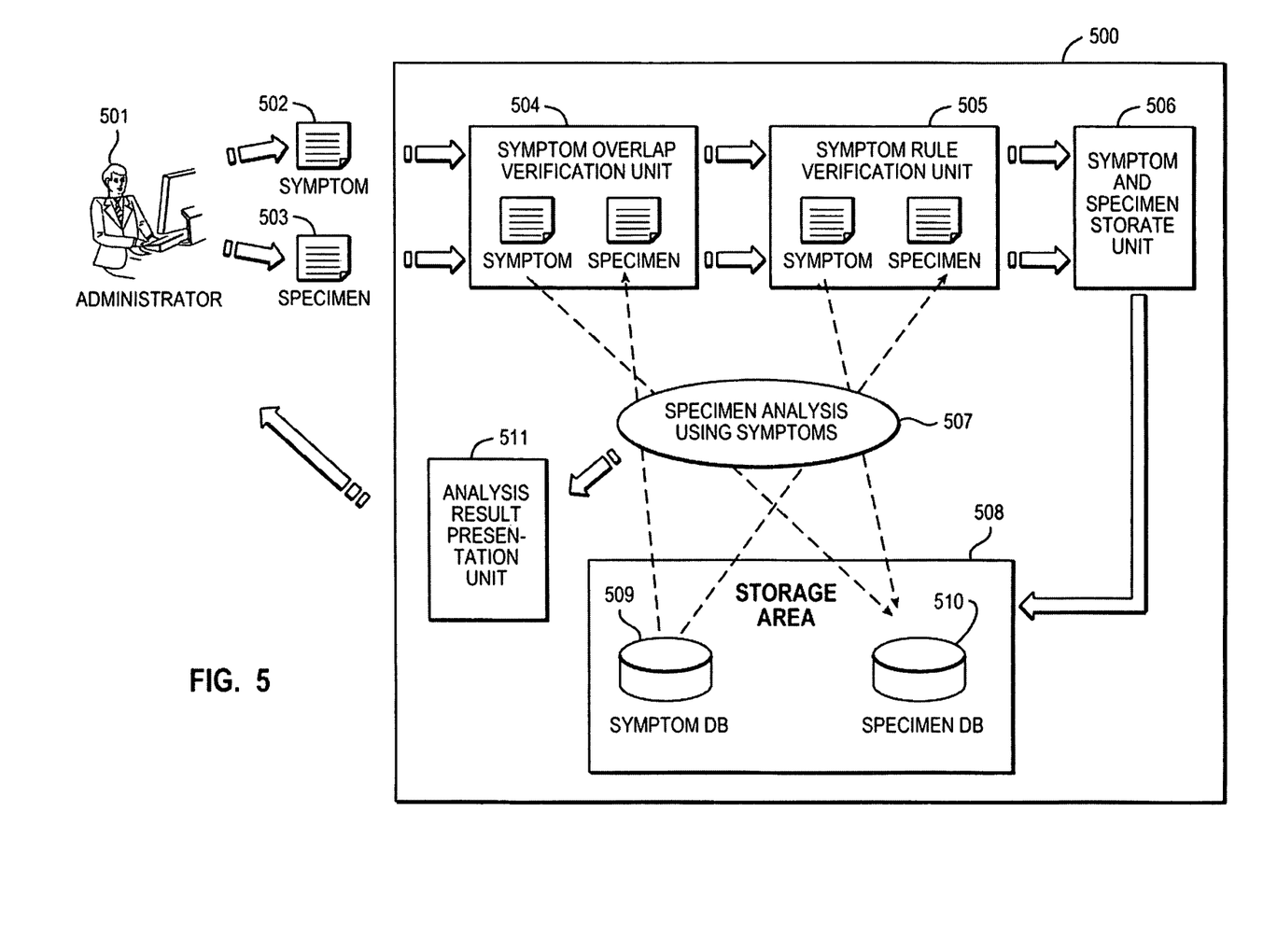
FIG. 5 is a diagram illustrating a computer system according to an embodiment of the present invention.

Specimens may be used to determine whether the administrator should add a new symptom to a symptom database, as discussed below with reference to FIGS. 5-8. FIG. 5 shows a general view of one embodiment of a computer system (500) in accordance with the present invention. The computer system (500) may include a server computer for implementing autonomic computing or a computer associated with the server computer. In the computer system of FIG. 5, specimens include a new specimen (503) and specimens stored in the specimen database (510) (also referred to as existing specimens).

The computer system or the administrator generates a new specimen (503) according to the generation of a new symptom (502) in order to determine whether to add the new symptom to the symptom database (509). The new specimen (503) may include a short specimen and a long specimen. In FIG. 5, the new specimen (503) is generated by the administrator (501). Alternatively, a program for generating the new specimen may cause a computer system to automatically generate the new specimen. The new specimen includes a set of events detected according to the rule of the corresponding new symptom on the basis of a log file or dump file. For example, a short specimen includes a set of events matching a set of events detected according to the rule included in the corresponding new symptom. A long specimen includes a set of events matching a set of events detected according to the rule included in the corresponding new symptom and a set of events preceding, following, or both preceding and following the set of events. After verification, the administrator stores the new specimen into the specimen database (510).

The existing specimens are also used to determine whether to add the new symptom to the symptom database. An existing specimen may include a short specimen and a long specimen.

Returning to FIG. 4, short specimen (403) includes only a set of events identified in the order of TCPC0003E and CHFW0029E, and long specimen (402) includes a set of events identified in the order of TCPC0003E and CHFW0029E and a set of events preceding and following that set of events. In order to determine whether to add symptom A to the symptom database, the administrator or the system provides a short specimen (403) and a long specimen (402) corresponding to the symptom A.

With reference to FIG. 5, the administrator (501) of the computer system (500) inputs a new symptom (502) and a new specimen (503) corresponding to the new symptom (502). The new specimen (503) includes a short specimen and a long specimen corresponding to the new symptom (502). Then, the administrator (501) initiates a specimen analysis using symptoms (507) to determine whether to add the new symptom (502) to the symptom database (509).

Specimen analysis using symptoms (507) is described below with reference to FIGS. 6-8. If a specimen includes a set of events detected according to the rule of a symptom, the specimen is extracted by the symptom. Extracting the specimen is referred to as "specimen hit" in this specification.

The symptom overlap verification unit (504) verifies that the new symptom (502) does not overlap with a symptom stored in the symptom database (509), as described in greater detail with reference to FIG. 6 below.

The symptom rule verification unit (505) verifies the accuracy of the rule of the new symptom (502), as described in greater detail with reference to FIG. 7 below. The symptom rule verification unit (505) also verifies the accuracy of rules of the symptoms stored in the symptom database (509) (hereinafter, referred to as 'existing symptoms'). FIG. 8 shows the details of this verification. Although FIG. 5 shows the symptom overlap verification unit (504) and the symptom rule verification unit (505) as separate units, the symptom overlap verification unit and the symptom rule verification unit may be unified into a single symptom verification unit.

The symptom and specimen storage unit (506) is a storage area for temporarily storing the new symptom (502) and the new specimen (503) corresponding to the new symptom (502). The symptom and specimen storage unit (506) may have an arbitrary configuration.

The storage area (508) includes the symptom database (509) and the specimen database (510). The storage area (508) may be a magnetic recording medium such as a hard disk or a semiconductor disk such as a silicon disk. The symptom database (509) and the specimen database (510) may be recorded on the same recording medium or alternatively may be recorded on different recording mediums separately or in a distributed manner. An analysis result presentation unit (511) generates information for displaying a result of the specimen analysis using symptoms (507) on a display device connected to the system of the administrator (501).

The administrator (501) may determine whether to store the new symptom (502) and the new specimen (503) corresponding to the new symptom (502) into the symptom database (509) and the specimen database (510), respectively, on the basis of the result of the specimen analysis using symptoms (507). Alternatively, the administrator (501) is allowed to modify the rule of the new symptom (502) (including making the rule more strict to increase the accuracy), to delete unnecessary events of the new specimen (503), and to make the rule of the existing symptom stored in the symptom database (509) more strict.

Figure 6:
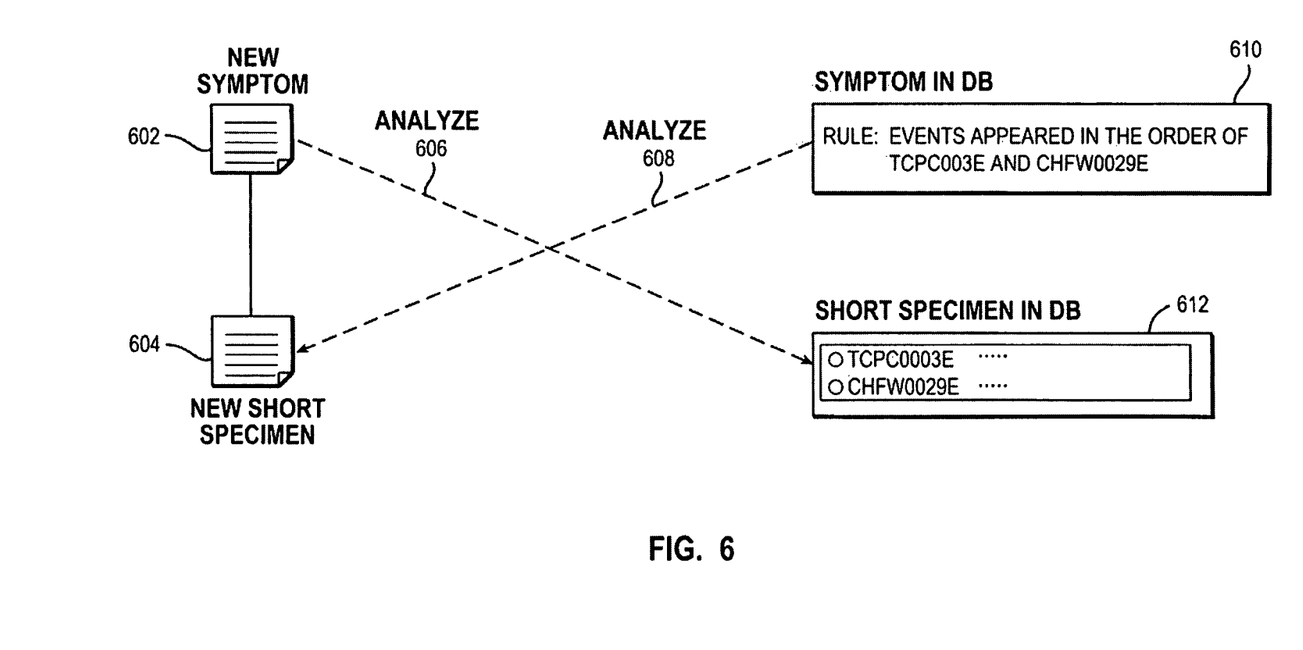
FIG. 6 is a diagram illustrating an embodiment of repeated symptom definition verification.

FIG. 6 is a diagram illustrating an embodiment of repeated symptom definition verification. Verifying that the symptom definition is not a repeated symptom definition is carried out by analyzing (606) a short specimen (612) of an existing specimen stored in the specimen database using the new symptom (602) and analyzing (608) a new short specimen (604) using a symptom (610) stored in the symptom database. The new symptom (602) overlaps a symptom (610) stored in the symptom database if the analysis of the short specimen (612) stored in the specimen database shows that the short specimen hits (i.e., the short specimen in the specimen database includes a set of events detected according to the rule of the new symptom (602)), the analysis of the new specimen (604) shows that the new specimen hits according to the rule of an existing symptom (610), and the set of events of the hitting short specimen (612) matches the set of events of the new specimen (604). Returning to FIG. 5, in that case, the analysis result presentation unit (511) presents the administrator (501) with a notification that the new symptom (502) overlaps with a symptom stored in the symptom database (509). The administrator (501) may decline to store the new symptom (502) into the symptom database (509) on the basis of the presentation. Furthermore, the administrator (501) may decline to store the new specimen (503) corresponding to the new symptom (502) into the specimen database.

Figure 7:
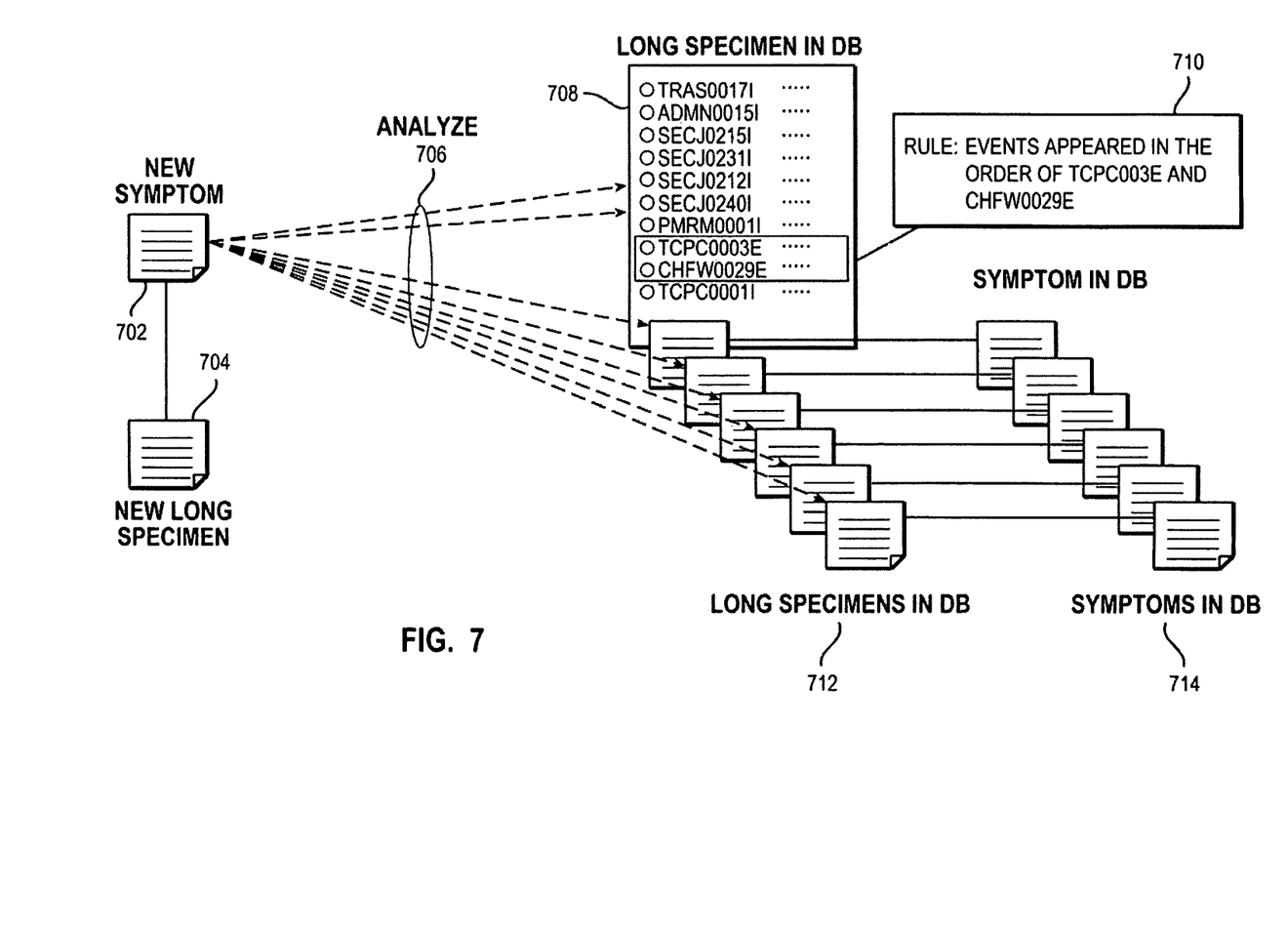
FIG. 7 shows the verification of the rule of a new symptom.

FIG. 7 shows the verification of the rule of a new symptom. The new symptom (702) corresponds to a new long specimen (704) generated according to the new symptom (702). Existing long specimens (712) stored in the specimen database each correspond to existing symptoms (714) stored in the symptom database. The rule (710) of the new symptom (702) is verified by analyzing (706) a long specimen (708) (which is an existing specimen) stored in the specimen database using the new symptom (702). The analysis determines whether there is a hit of a long specimen (708) stored in the specimen database including a set of events detected according to the rule (710) of the new symptom (702) by the analysis of the long specimen (708). Returning to FIG. 5, if one or more long specimens hit, the analysis result presentation unit (511) presents the existing long specimens that have hit or the number of long specimens hit according to the rule of the new symptom (502). Moreover, if necessary, the analysis result presentation unit (511) presents that the accuracy of the new symptom (502) may be low on the basis of the existing specimens. The administrator (501) may examine the existing long specimens that have hit from the presentation and increase the accuracy of the rule of the new symptom (502) by modifying the rule if there is a hit of a long specimen unrelated to the symptom.

Figure 8:
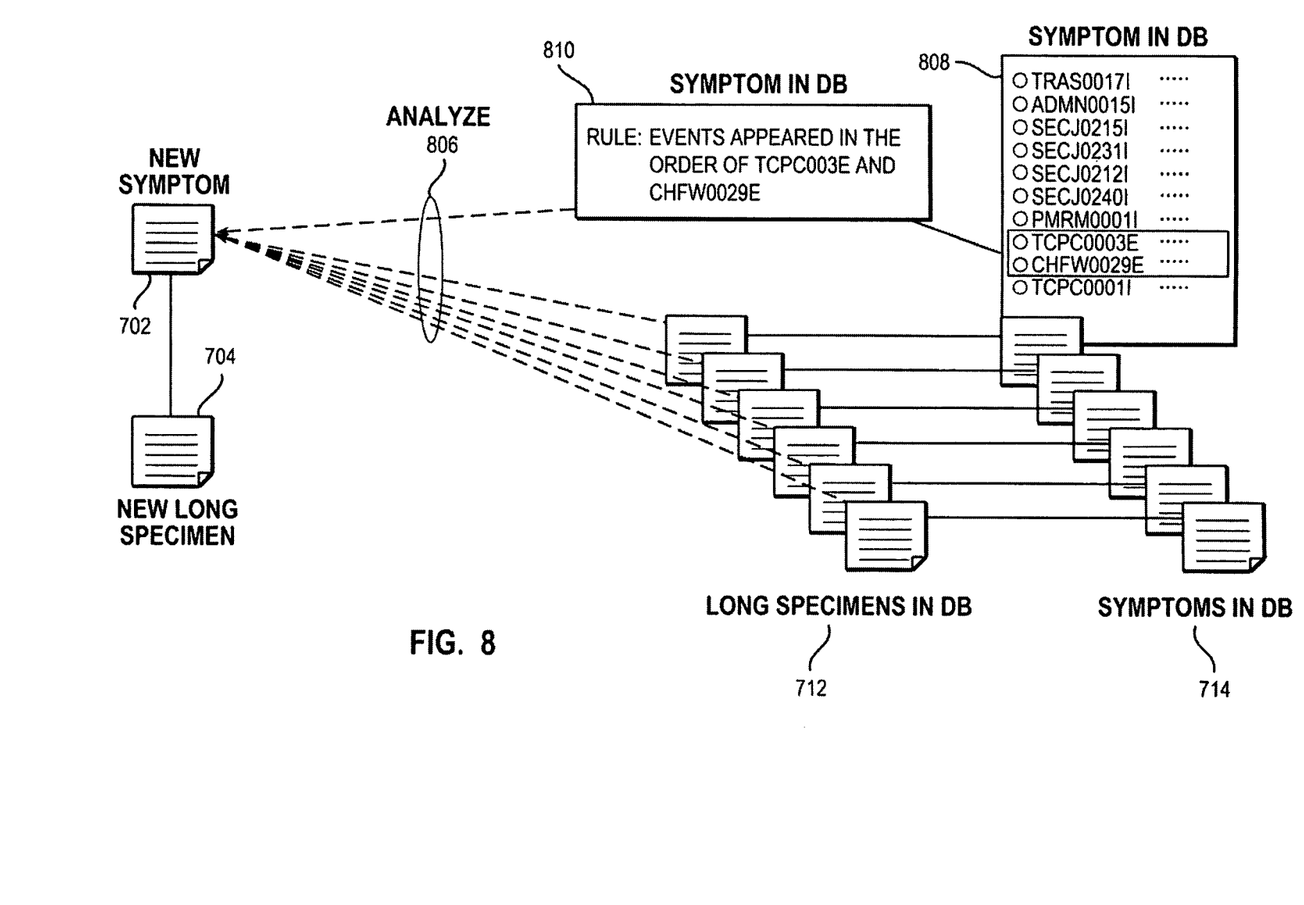
FIG. 8 shows the verification of the rules of existing symptoms.

FIG. 8 shows the verification of the rules of existing symptoms. The new symptom (702) corresponds to a new long specimen (704) generated according to the new symptom (702). Existing long specimens (712) stored in the specimen database each correspond to existing symptoms (714) stored in the symptom database. Verifying the rule (810) of an existing symptom (808) is carried out by analyzing (806) the new long specimen (704) using an existing symptom (808) stored in the symptom database. The analysis determines whether there is a hit of the new long specimen (704) according to the rule (810) of the existing symptom (808). Referring to FIG. 5, in response to a hit of the new specimen, the analysis result presentation unit (511) presents an existing symptom including the rule that has produced the hit of the new specimen. The analysis result presentation unit (511) presents the number of existing symptoms that cause the hit of the new specimen. If necessary, the analysis result presentation unit (511) presents that the accuracy of the existing symptom may be low on the basis of the new specimen. The administrator (501) checks if there is any problem described in the existing symptom from the presentation. If there is a problem, the administrator (501) may delete the set of unnecessary events in the new specimen (503) to prevent the occurrence of the hit. On the other hand, unless there is a problem, the administrator (501) may modify the rule of the existing symptom concerned to increase the accuracy of the rule.

In order to verify the modified rule of the existing symptom, the system analyzes the new specimen (503), which may be the new long specimen, for example, using the modified existing symptom.

Figure 9:
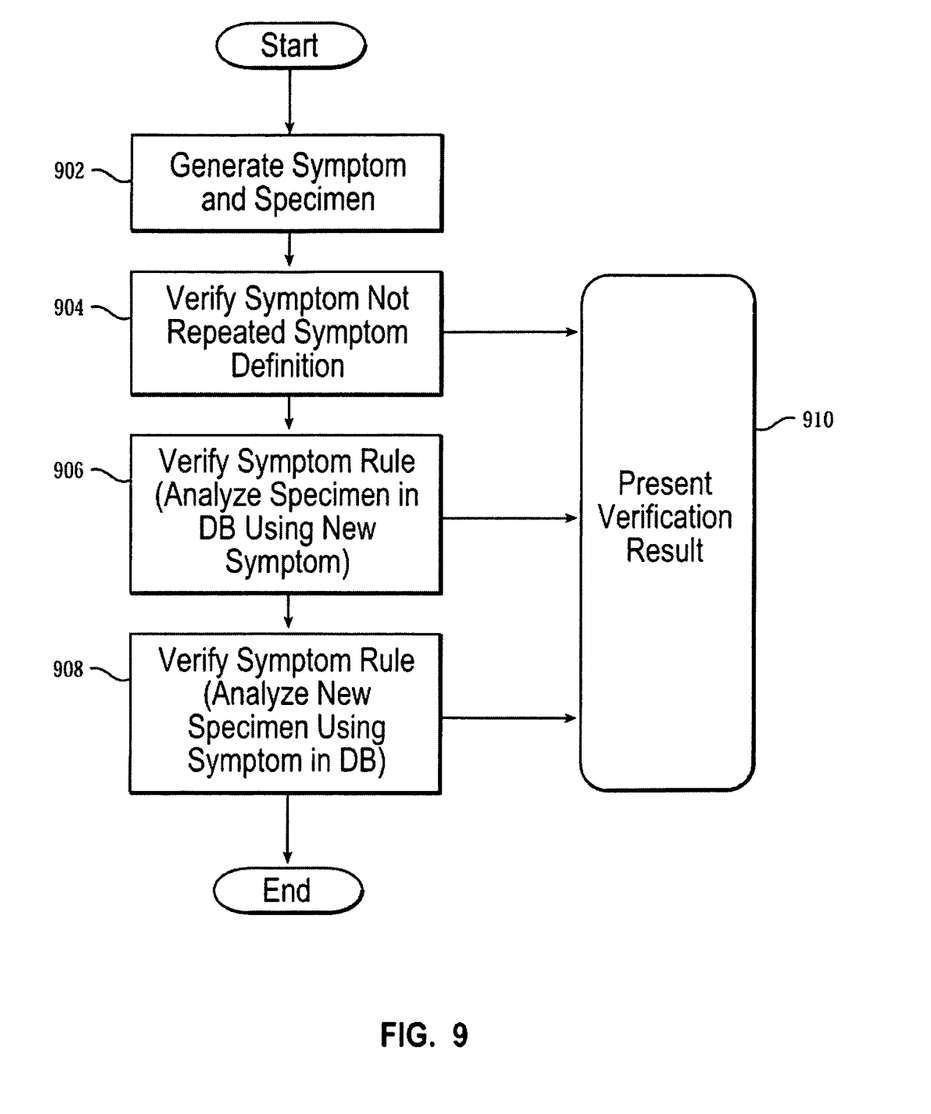
FIG. 9 is a flow chart illustrating the verification of a symptom.

FIG. 9 is a flowchart showing the verification of a symptom. In some embodiments, the repeated definition is verified first. However, in other embodiments, performing the verification of the repeated symptom definition is carried out after the verification of the symptom rule. The analysis of the specimen in the database using the new symptom may precede the analysis of a new specimen using the symptom in the database for the verification of the symptom rule, or the analysis of the new specimen using the symptom in the database may precede the analysis of the specimen in the database using the new symptom for the verification of the symptom rule. In various embodiments, portions of the method as described above may be carried out in any order.

The method of FIG. 9 begins by generating the new symptom and the new specimen (block 902). The method also includes verifying that the symptom definition is not a repeated symptom definition (block 904), as described above with reference to FIG. 6. Verifying that the symptom definition is not a repeated symptom definition ensures that the new symptom does not overlap with a symptom stored in the symptom database. The method also includes verifying the symptom rule. Verifying the symptom rule may include analyzing an existing specimen stored in the specimen database using the new symptom (block 906), as described above with reference to FIG. 7. Analyzing an existing specimen may include analyzing the first specimen of an existing specimen. Verifying the symptom rule may include analyzing a new specimen using the existing symptoms stored in the symptom database (block 908), as described above with reference to FIG. 8. The method also includes presenting verification results from any of the verification processes discussed above (block 910).

An exemplary computer system used in this embodiment of the present invention may have a CPU and a main memory, which are connected to a bus. The bus is connected to a display device such as an LCD monitor via a display controller. In addition, the bus is connected to a storage device such as, for example, a hard disk, silicon disk, CD, DVD, or other various drives, via an IDE or SATA controller. For a client computer or a server computer, the internal configuration is the same as the above computer system.

It should be understood that the inventive concepts disclosed herein are capable of many modifications. To the extent such modifications fall within the scope of the appended claims and their equivalents, they are intended to be covered by this patent.

What is claimed is:

1. A computer system for enabling verification of a new symptom, the new symptom including a rule for detecting a set of events related to a given problem, comprising:
   a symptom database which stores existing symptoms;
   a specimen database which stores existing specimens, wherein an existing specimen includes a set of events detected according to a rule of one of the existing symptoms; and
   an analysis unit comprising a computer processor and a computer memory operatively coupled to the computer processor, the computer memory having disposed within it computer program instructions capable of analyzing the existing specimens stored in the specimen database using the new symptom to determine whether to add the new symptom to the symptom database,
   wherein the existing specimen includes a first specimen and a second specimen, wherein the first specimen is a subset of the second specimen, wherein the first specimen includes a set of events detected according to a rule of a certain symptom, and the second specimen includes the first specimen and at least one of events preceding the first specimen and events following the first specimen, and wherein the first specimen and the second specimen are distinguishable,
   wherein computer program instructions capable of analyzing the existing specimens stored in the specimen database using the new symptom comprise computer program instructions capable of:
      analyzing the first specimen of an existing specimen stored in the specimen database using the new symptom; and
      analyzing a new specimen using the existing symptoms stored in the symptom database, wherein the new specimen includes a set of events detected according to the rule of the new symptom, and
   wherein the computer memory also has disposed within it computer program instructions capable of presenting results indicative of the new symptom overlapping a symptom stored in the symptom database if the analysis of the first specimen of the existing specimen shows that the first specimen overlaps with a symptom stored in the symptom database, the analysis of the new specimen shows that the new specimen overlaps with a symptom stored in the symptom database, and the set of events of the overlapping first specimen matches the set of events of the overlapping new specimen.

2. The computer system according to claim 1, wherein the first specimen includes only a set of events detected according to the rule of the certain symptom.

3. The computer system according to claim 1, wherein computer program instructions capable of analyzing the existing specimens stored in the specimen database using the new symptom comprise computer program instructions capable of analyzing a second specimen of an existing specimen stored in the specimen database using the new symptom.

4. The computer system according to claim 3, wherein the computer memory also has disposed within it computer program instructions capable of presenting the second specimen of the existing specimen if the analysis of the second specimen of the existing specimen using the new symptom shows that the second specimen overlaps with a symptom stored in the symptom database.

5. The computer system according to claim 1, wherein the computer memory also has disposed within it computer program instructions capable of analyzing a new specimen using the existing symptoms stored in the symptom database, and wherein the new specimen includes a set of events detected according to the rule of the new symptom.

6. The computer system according to claim 5, wherein the computer memory also has disposed within it computer program instructions capable of, if the analysis of the new specimen using the existing symptoms shows that the new specimen overlaps with a symptom stored in the symptom database with one of the existing symptoms resulting in a overlapping existing symptom, presenting the overlapping existing symptom.

7. The computer system according to claim 1, further comprising a symptom and specimen storage area separate from the symptom database and the specimen database for temporarily storing at least one new symptom and at least one corresponding new specimen.

8. A computer-implemented method for enabling verification of a new symptom, the new symptom including a rule for detecting a set of events related to a given problem, the method comprising:
  providing a symptom database which stores existing symptoms;
  providing a specimen database which stores existing specimens, wherein an existing specimen includes a set of events detected according to a rule of one of the existing symptoms; and
  analyzing the existing specimens stored in the specimen database using a new symptom in order to determine whether to add the new symptom to the symptom database,
  wherein the existing specimen includes a first specimen and a second specimen, wherein the first specimen is a subset of the second specimen, wherein the first specimen includes a set of events detected according to a rule of a certain symptom, and the second specimen includes the first specimen and at least one of events preceding the first specimen and events following the first specimen, and wherein the first specimen and the second specimen are distinguishable,
  wherein computer program instructions capable of analyzing the existing specimens stored in the specimen database using the new symptom comprise computer program instructions capable of:
    analyzing the first specimen of an existing specimen stored in the specimen database using the new symptom; and
    analyzing a new specimen using the existing symptoms stored in the symptom database, wherein the new specimen includes a set of events detected according to the rule of the new symptom, and
  wherein the computer memory also has disposed within it computer program instructions capable of presenting results indicative of the new symptom overlapping a symptom stored in the symptom database if the analysis of the first specimen of the existing specimen shows that the first specimen overlaps with a symptom stored in the symptom database, the analysis of the new specimen shows that the new specimen overlaps with a symptom stored in the symptom database, and the set of events of the overlapping first specimen matches the set of events of the overlapping new specimen.

9. The method according to claim 8, wherein the first specimen includes only a set of events detected according to the rule of the certain symptom.

10. The method according to claim 8, wherein analyzing the existing specimens stored in the specimen database using the new symptom comprises analyzing a second specimen of an existing specimen stored in the specimen database using the new symptom.

11. The method according to claim 8, further comprising analyzing a new specimen using the existing symptoms stored in the symptom database, wherein the new specimen includes a set of events detected according to the rule of the new symptom.

12. The method according to claim 8, further comprising the step of presenting a result of the analysis.

13. The method according to claim 8, further comprising temporarily storing at least one new symptom and at least one new specimen in a symptom and specimen storage area, the symptom and specimen storage area being separate from the symptom database and the specimen database.

14. A computer program product for enabling verification of a new symptom, the new symptom including a rule for detecting a set of events related to a given problem, the computer program product disposed upon a non-transitory computer-readable medium, the computer program product comprising:
  computer program instructions capable of maintaining a symptom database which stores symptoms;
  computer program instructions capable of maintaining a specimen database which stores specimens, each including a set of events detected according to a rule of a certain symptom; and
  computer program instructions capable of analyzing existing specimens stored in a specimen database using the new symptom in order to determine whether to add the new symptom to a symptom database containing existing symptoms,
  wherein the existing specimen includes a first specimen and a second specimen, wherein the first specimen is a subset of the second specimen, wherein the first specimen includes a set of events detected according to a rule of a certain symptom, and the second specimen includes the first specimen and at least one of events preceding the first specimen and events following the first specimen, and wherein the first specimen and the second specimen are distinguishable,
  wherein computer program instructions capable of analyzing the existing specimens stored in the specimen database using the new symptom comprise computer program instructions capable of:
    analyzing the first specimen of an existing specimen stored in the specimen database using the new symptom; and
    analyzing a new specimen using the existing symptoms stored in the symptom database, wherein the new specimen includes a set of events detected according to the rule of the new symptom, and
  wherein the computer memory also has disposed within it computer program instructions capable of presenting results indicative of the new symptom overlapping a symptom stored in the symptom database if the analysis of the first specimen of the existing specimen shows that the first specimen overlaps with a symptom stored in the symptom database, the analysis of the new specimen shows that the new specimen overlaps with a symptom stored in the symptom database, and the set of events of the overlapping first specimen matches the set of events of the overlapping new specimen.

* * * * *